(12) United States Patent
Lee et al.

(10) Patent No.: US 6,400,849 B1
(45) Date of Patent: Jun. 4, 2002

(54) IMAGE PROCESSING SYSTEM WITH ENHANCED PROCESSING AND MEMORY MANAGEMENT

(75) Inventors: Shih-Jong J. Lee, 15418 SE 53rd Pl., Bellevue, WA (US) 98006; Louis R. Piloco, Kent; Larry A. Nelson, Seattle, both of WA (US)

(73) Assignee: Shih-Jong J. Lee, Bellevue, WA (US)

( * ) Notice: Subject to any disclaimer, the term of this patent is extended or adjusted under 35 U.S.C. 154(b) by 0 days.

(21) Appl. No.: 09/693,723

(22) Filed: Oct. 20, 2000

(51) Int. Cl.[7] .............................. G06T 5/20; G06T 1/20
(52) U.S. Cl. ...................... 382/260; 382/302; 382/304; 382/307; 382/308; 382/265; 382/279; 708/308; 708/315; 708/320
(58) Field of Search .................................. 382/260, 261, 382/265, 257, 302, 303, 304, 307, 308, 254, 274, 266, 279; 708/300, 303, 308, 320, 315

(56) References Cited

U.S. PATENT DOCUMENTS

| | | | | | |
|---|---|---|---|---|---|
| 4,363,104 A | * | 12/1982 | Nussmeier | ................... | 382/304 |
| 4,692,944 A | * | 9/1987 | Masuzaki et al. | ........... | 382/304 |
| 4,845,663 A | * | 7/1989 | Brown et al. | ................ | 382/308 |
| 5,046,190 A | * | 9/1991 | Daniel et al. | ................ | 382/303 |
| 5,172,419 A | * | 12/1992 | Manian | ...................... | 382/132 |
| 5,260,888 A | * | 11/1993 | Sharman | ...................... | 708/308 |

* cited by examiner

Primary Examiner—Scott Rogers

(57) ABSTRACT

An image processing method using memory management and pre-computed look up tables to speed up computations. Application of filters along directions other than image rows is simplified using several structured processing approaches that improve image data cache-ability. Time consuming or repeated computations are pre-computed and stored as look up tables to reduce the time required for image processing and to remove or reduce the need for special purpose image processing hardware.

8 Claims, 13 Drawing Sheets

IMAGE PROCESSING SYSTEM WITH ENHANCED PROCESSING AND MEMORY MANAGEMENT

U.S. PATENT REFERENCES

1. U.S. Pat. No. 5,315,700 entitled, "Method and Apparatus for Rapidly Processing Data Sequences", by Johnston et al, May 24, 1994
2. U.S. Pat. No. 6,130,967 entitled, "Method and Apparatus for a Reduced Instruction Set Architecture for Multidimensional Image Processing", by Shih-Jong J. Lee, et. al., Oct. 10, 2000
3. Pending Application Ser. No. 08/888,116 entitled, "Method and Apparatus for Semiconductor Wafer and LCD Inspection Using Multidimensional Image Decomposition and Synthesis", by Shih-Jong J. Lee, et. al., filed Jul. 3, 1997
4. U.S. Pat. No. 6,122,397 entitled, "Method and Apparatus for Maskless Semiconductor and Liquid Crystal Display Inspection", by Shih-Jong J. Lee, et. al., Sep. 19, 2000
5. Pending Application Ser. No. 08/888,119 entitled, "Method and Apparatus for Incremental Concurrent Learning in Automatic Semiconductor Wafer and Liquid Crystal Display Defect Classification", by Shih-Jong J. Lee et. al., filed Jul. 3, 1997

CO-PENDING U.S. PATENT APPLICATION INCORPORATED BY REFERENCE INTO THIS APPLICATION

1. Co-Pending U.S. patent application Ser. No. 09/693,378 entitled, "Image Processing Apparatus Using a Cascade of Poly-Point Operations" by Shih-Jong J. Lee
2. Co-Pending U.S. patent application Ser. No. 09/692,948 entitled, "High Speed Image Processing Using a Cascade of Elongated Filters Programmed in a Computer", by Shih-Jong J. Lee, et. al.

TECHNICAL FIELD

This invention relates to high-speed image processing, specifically to an improved method for reducing the computational load of image filtering, reconstruction or interpretation.

BACKGROUND OF THE INVENTION

Prior art imaging systems present images directly to the human user or store images on film. Such prior art systems are limited in capability by the physical limitations of film or by the limitations imposed by the direct viewing environment. Such prior art imaging is pervasive in its application to industrial, medical, scientific, and consumer uses and is commercially ubiquitous.

Uses for images and processed images include medical imaging, where X-rays, MRI, ultrasound, and CAT scan images are used routinely for diagnosing and treating patients. Industrial applications include inspection of components such as machined parts, or process inspection such as paper or textile manufacturing, semiconductor manufacturing, even security inspection. Images also have consumer applications. Chief among consumer applications is the capture of images on film or digitally as files for later viewing.

Modern imaging systems frequently provide facilities for storing images electronically as sampled data (pixels) that can be saved in computer memory. Such presentation provides convenient storage, flexibility for transmission, and the opportunity to improve upon the basic image data according to the task for which the image is to be used. The basic task of storing images electronically is challenging. Current image resolution, color gamut, and image size require massive storage. For example, an image may have 16 bit quantization of color coded as red, green and blue and 2048 by 2048 pixel resolution, and therefore require 24 Megabytes of memory. Storing, retrieving, processing or displaying images may exceed the the limit capability of current general purpose computers for these useful applications.

In the prior art, images that are stored electronically are processed to improve the basic image or to enhance their utilization toward a specific purpose. For example, an image can be filtered to reduce noise, edge enhanced to increase sharpness, or stretched to improve contrast, thereby making the image more visible. Images may also be interpreted by computing systems that locate and track objects or detect particular characteristics of the images or the objects within those images. Systems that process or interpret images include Data Cube Max Video, Cognex MVS 8000, and TriPath Imaging AutoPap system. These systems are generally constructed from special purpose hardware to provide custom facilities for performing image processing operations and image storage. Special purpose facilities for image processing increase system throughput capability but at significant cost and complexity. Present generation system throughput limits the complexity of the image processing operations that can be undertaken, particularly in cost sensitive applications.

Prior Art image processing system throughput is constrained by the enormity of the computational task that must be performed in typical image processing operations. An example of a task well known in the art is filtering. Prior art systems accomplish filtering through convolution, an operation which involves multiple floating point multiplications and additions in order to determine a single output value. For a 3 by 3 kernel operating on a monochrome image, determination of a single filtered image output pixel value requires 9 multiplications and 8 additions. On a large or high resolution or color image, there are millions of output values that must be so computed in order to filter the image. To overcome this difficult computational task, specialized hardware is developed. However, the specialized hardware is expensive and difficult to program. Today large kernel or three-dimensional operations are still prohibitively expensive (or slow) even with specialized hardware due to the geometric increase in the computational requirement.

The specialized hardware approach includes more than just the image processing. Every facet of the application receives special facilities. For example, prior art image processing systems usually include special facilities for video acquisition, display and storage as well as processing. Each of these special facilities requires specialized development tools. This creates a high cost of ownership and restricts application development to specialists who are familiar with the technology. Also, the custom hardware architectures that result are slow to change to incorporate technological advancements that are easily available if it were possible to borrow them from higher volume applications. For example, rapid advancements in the hardware and software technologies in personal computer (PC) are not rapidly incorporated into these special purpose systems thereby denying the benefit such advancements would bring if rapidly and automatically incorporated. As another example, recent advances in digital stream media technology are rapidly making custom hardware platforms obsolete.

Datacube recently announced end of life for its Max Video 250. Prior art industrial vision systems such as these fail to capitalize on enhancements in technology targeted for the consumer applications. The result of the prior art methods is to limit the technology to high-end applications and products that can absorb the excessive cost.

OBJECTS AND ADVANTAGES

It is an object of this invention to increase the speed with which image processing operations can operate on electronically stored images. A further object of the invention is to pre-compute and store as tables certain time consuming or repeated computations to reduce the time required for image processing and to remove or reduce the need for special purpose image processing hardware.

SUMMARY OF THE INVENTION

It is the object of the invention to provide very efficient and high speed image processing methods for single or multiple CPUs. Another consistent objective is to provide image processing mechanisms that utilize contemporary and ubiquitous computer architectures more efficiently to produce much higher throughput. It is a further objective to provide the improved image processing mechanisms in a manner that removes or minimizes the use of special purpose hardware designed only for an image processing task, because the invention is such that more general purpose hardware can accomplish the task with useful throughput.

According to one embodiment, the invention uses multiple CPUs wherein multiple image processing tasks are performed serially or in parallel by separate CPUs.

In another embodiment, CPU's operate to implement heretofore multi-step functions in a single operation by use of pre-programmed look up tables.

In another embodiment, the invention includes non-linear image processing functions.

In another embodiment, the processing of image memory horizontally is accelerated by use of flat filters.

In another embodiment, the processing of image memory vertically is accomplished horizontally first then incremented vertically to increase throughput.

In still another embodiment, the processing of image memory along an off-axis direction is simplified and made faster by address offsets.

In another embodiment the processing of image memory along a circular path is simplified and made faster by address offsets.

In another embodiment, point operations are combined with kernel operations.

In another embodiment, intermediate results from look up table operations are provided.

DETAILED DESCRIPTION OF THE INVENTION

Figure 1:
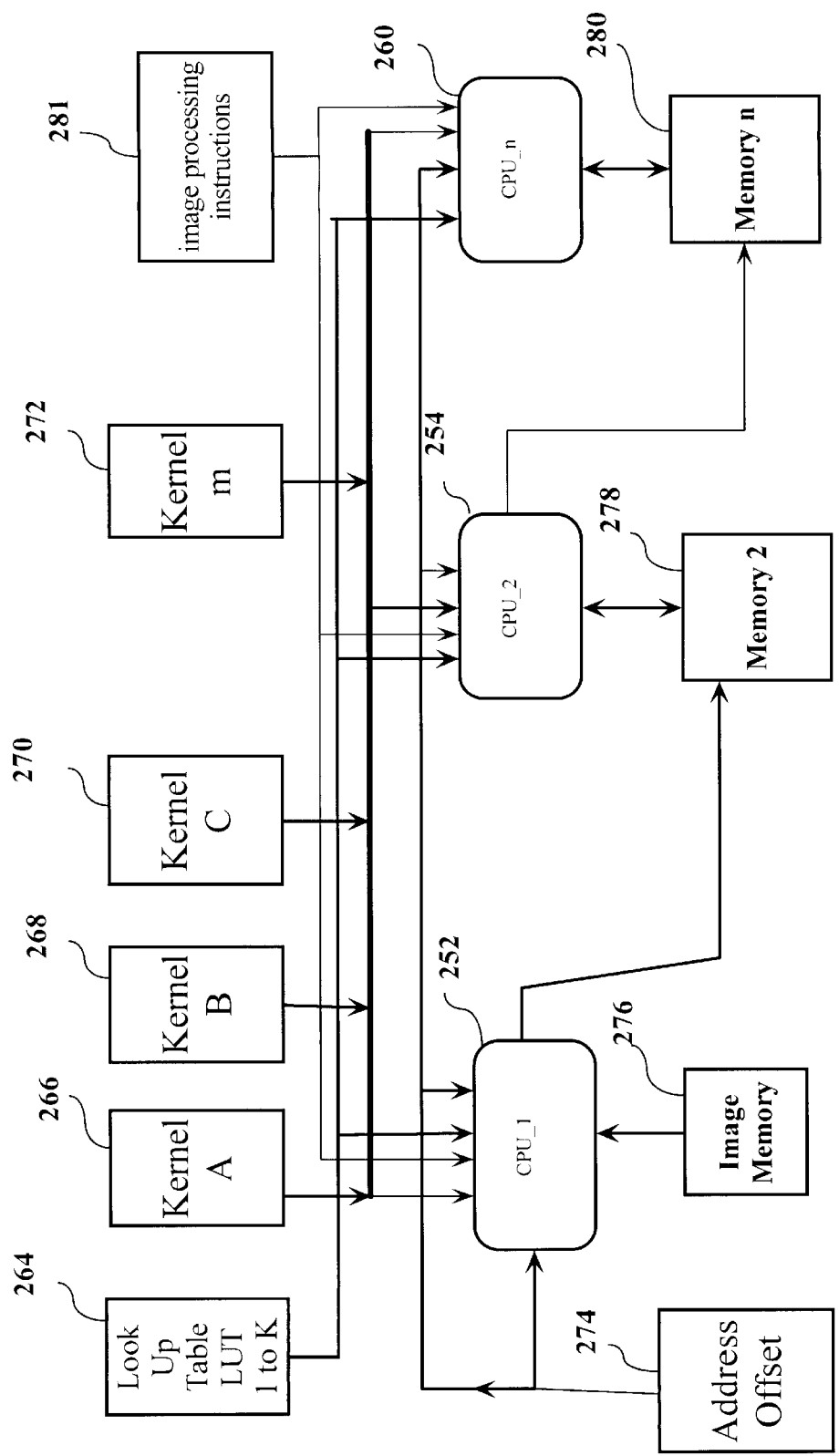
FIG. 1 is an illustrative block diagram of a multiple CPU image processing system using enhanced processing and memory management techniques

An image processing system 290 is illustrated in FIG. 1. The image processing system accepts images stored in electronic form and processes them to produce derivative information or altered images. In the presently constructed embodiment of the invention, the image processing system 290 processes images of a semiconductor wafer placed in image memory 276 and determines through image analysis the satisfactory or unsatisfactory performance of the semiconductor wafer construction process which is imaged and stored in 276. However those skilled in the art will recognize that the subject invention could be used in image enhancement or analysis systems constructed for capturing and enhancing image data to provide an improved image of an object or to derive information regarding an object contained in an image for other purposes and the fields of application could be in other areas such as cell analyses for cancer detection or more broadly in interpreting multi-dimensional arrays of data having applications not related to imaging. An example of such an application could be performance modeling wherein, independent variables form the axes of the arrays of data. As a quite different example, in engine performance modeling temperature, speed, acceleration, air density, horsepower output and so forth could become axes for data organization which need to be filtered to aid characterization and condensation.

In an embodiment, the image memory 276 is a memory in a PC mother board and may contain one or more images. Each image contains data words wherein each data word is associated with a pixel or light element of the image. In a preferred embodiment of the invention, each data word is an eight bit binary data word proportional in value to the intensity of light on its associated pixel. An array of 512 by 512 data words, representing an array of 512 by 512 pixels, comprises an image. However, those skilled in the art will appreciate that the present invention is equally applicable for use with images constructed to provide more or less data describing the image and stored in other convenient locations such as disk in a local or remote database.

The system 290 is constructed to provide high speed image processing methods for single 252 or multiple CPUs 252, 254, 260 having image processing instructions 281 stored in memory. CPUs 252, 254, 260 are configurable in a pipeline or parallel fashion to minimize throughput delays and have flexible memory addressing. The system 290 is constructed so as to accomplish an image processing task with as few operations as possible and with the operations planned so to be executable in a minimum amount of time. The same or other processors 252, 254, 260 may be used to prepare for a particular image processing operation by performing polypoint operations (co-pending application titled, "Image Processing Apparatus Using a Cascade of Poly-Point Operations", incorporated reference 1), elongated operations (co-pending application titled, "High Speed Image Processing Using a Cascade of Elongated Filters Programmed in a Computer", reference 2) or defining Look Up Tables (LUTs) 264 and thereby reduce the time necessary to perform an image processing operation. A plurality of Look Up Tables (LUTs) 264 are provided that condense and combine multiple image processing computations responsive to an index to provide an output of pre-computed results in lieu of computation during image processing. A LUT 264 may combine point operations with kernel operations. Simple point operations are any image operations that use a single pixel input. Point operations can be complex and may include any operation that requires only a single pixel value from each of its input images. Example point operations include histograms for the region of interest within an image, dynamic range options for stretching or compressing image intensity information and other common image processing operations such as absolute value of an image, raising each pixel of an image to a power, inverting an image by negating the pixel values of an image, right or left bit shift (multiply or divide by multiples of 2 operations), trigonometric pixel operations, or clipping (non-linear processing) or scaling. Point operations to a constant include plus, minus, times, and divide. Relational operators are also point operations. Examples of relational point operations include equals, greater than, less than, greater than or equals, less than or equals, not equal, and so forth. Logical point operations can be applied to pixels from multiple input images or from the same image for bit plane operations where a bit plane of an image is interpreted as a bi-level image. Logical point operators include AND, OR, NOT, XOR, NAND, NOR, XNOR, and so forth.

In a preferred embodiment, a flexible addressing scheme 274 is included in 290 wherein address operations facilitate the memory access for off axis image processing by elongated linear filters and morphological filters whose operation is further described in co-pending patent application entitled, "High Speed Image Processing Using a Cascade of Elongated Filters Programmed in a Computer", reference 2 incorporated herein). Such flexible addressing may also be combined with other operations to provide translation, scaling, flip, transpose, skew, rotate, or linear transformation. Those skilled in the art will appreciate that the image processing system 290 may be programmed to perform other functions in addition to, or in lieu of, those described herein and the image processing system 290 can be implemented in a general purpose PC and the image processing instructions 282 and address offset 274 are computer programs and the image memory 276 as well as memory 2 278, memory n 280 and look up table LUT 1 to K can be part of the PC memory.

Figure 8:
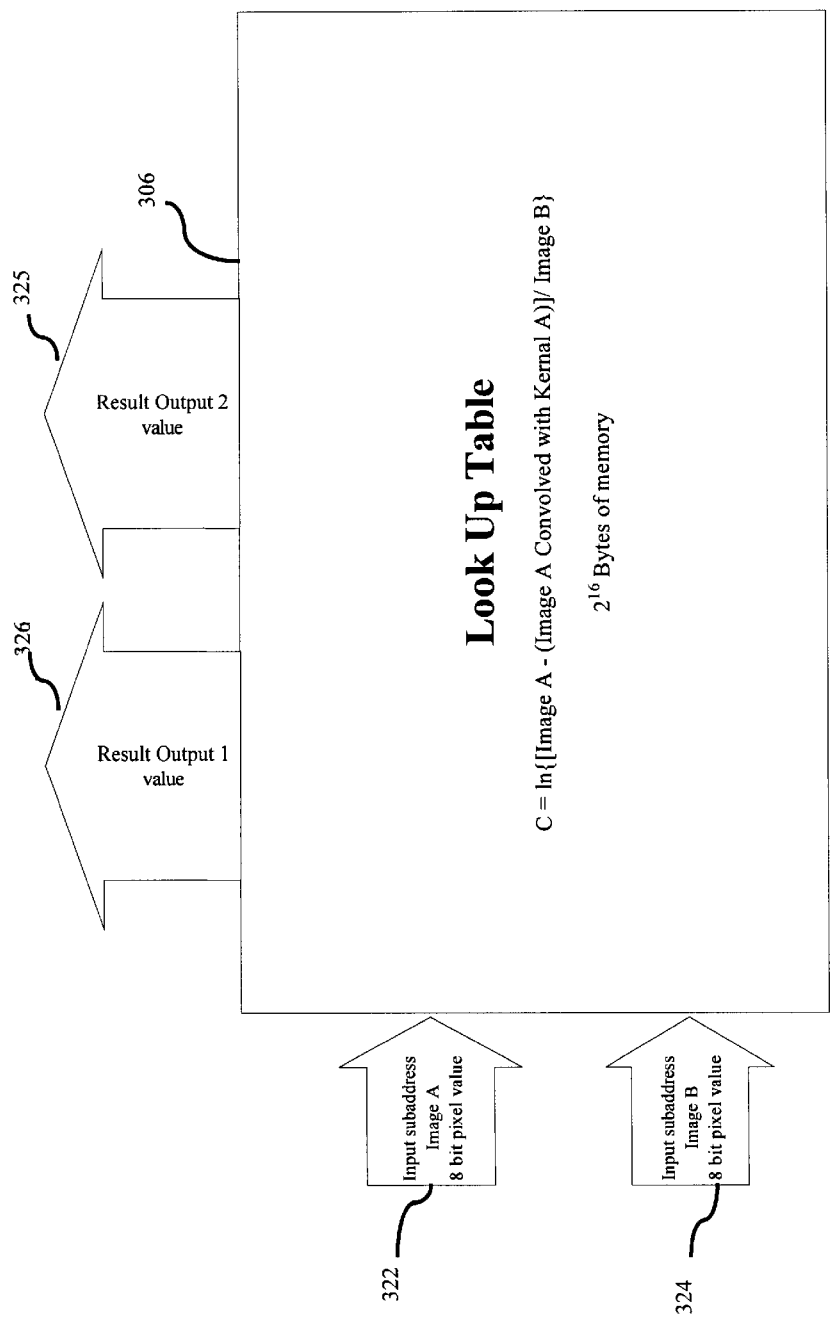
FIG. 8 is an example Look Up Table for aiding the computation of an example image processing function.

Each image processor 290 includes a plurality of CPUs whose operation can be configured in parallel so each CPU can operate on different images or on a different portion of a single image. The operation of the plurality of CPUs can also be pipelined so that each CPU operates on an image and hands off its result to a subsequent CPU for further processing of the same image. This architecture facilitates cascading of filtering or morphological operations with minimal throughput delay. The processing load of the CPUs can also be dynamically allocated by a multi-thread based operating system such as embedded Windows NT. Operation of any individual CPU may be understood by reference to FIG. 2 wherein a single CPU 352 is shown. The CPU 352 can perform routine image processing operations such as morphology, convolution, scaling, addition or subtraction. Alternatively it may have available a Look Up Table of results (LUT) 306, or multiple tables of results (282, 284, and 285 in FIG. 3), for point operations to retrieve a pre-computed result from the table of possible results. If it is faster to index this memory than to compute the result anew each time it is needed, time is saved by using the LUT approach. This is particularly important in image processing operations which are computationally expensive and where the same operation is performed repetitively on a plurality of pixels throughout an image or on multiple images to achieve the overall result. An example of a table of results for an image processing operation 306 is shown diagrammatically in FIG. 8 wherein 64K bytes of memory is allocated to describe all possible results for two image pixels undergoing an illustrative operation. This operation is illustrative of an application where image pixels are to be scaled and normalized according to the mean and expected deviation of a process that Image A and Image B represent. In this example an output pixel value result C is desired which is:

$$C = \ln\{[\text{Image } A - (\text{Image } A \text{ convolved with Kernel } A)] / \text{Image } B\} \quad \text{(equation 1)}$$

Figure 2:
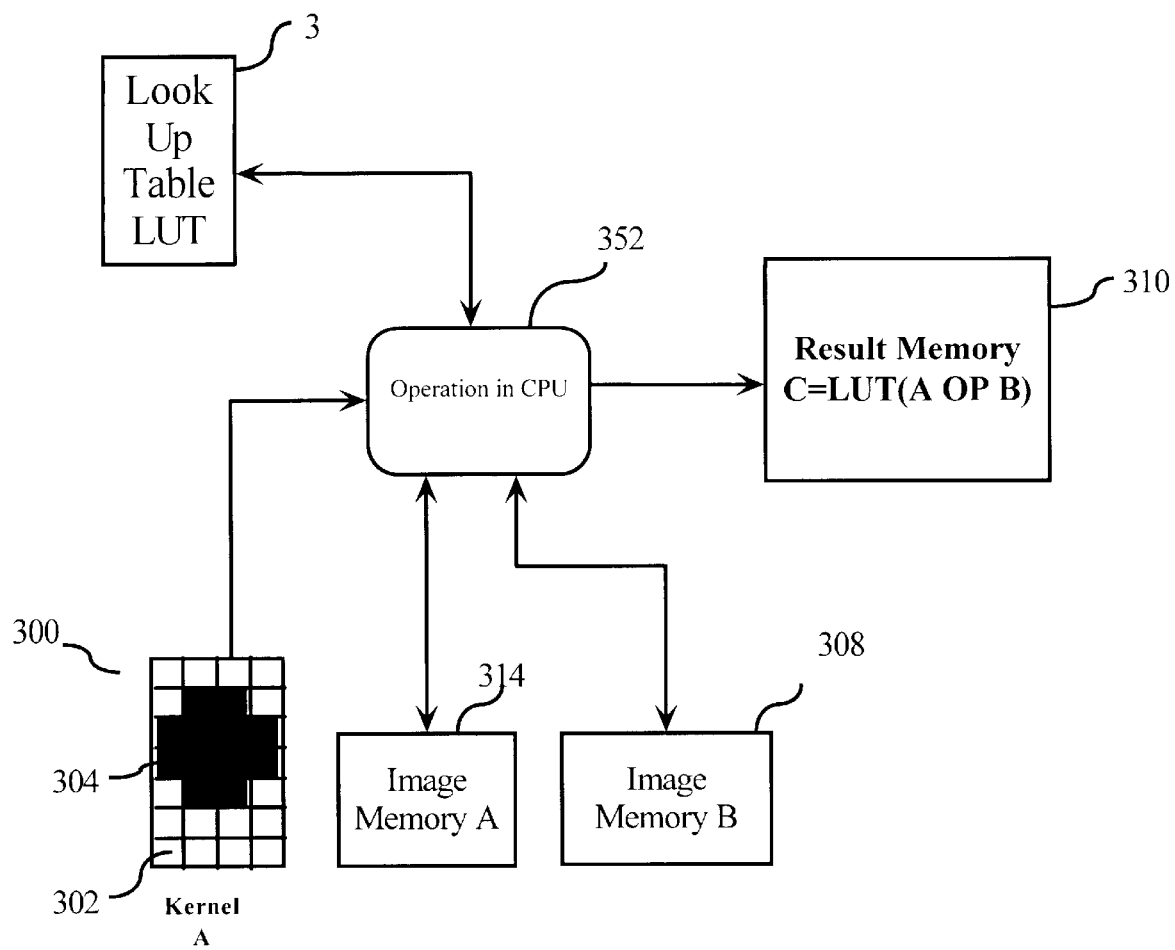
FIG. 2 is an illustrative block diagram showing the method of combining operations on a data set into one operation, expressed as a Look Up Table.
Figure 9:
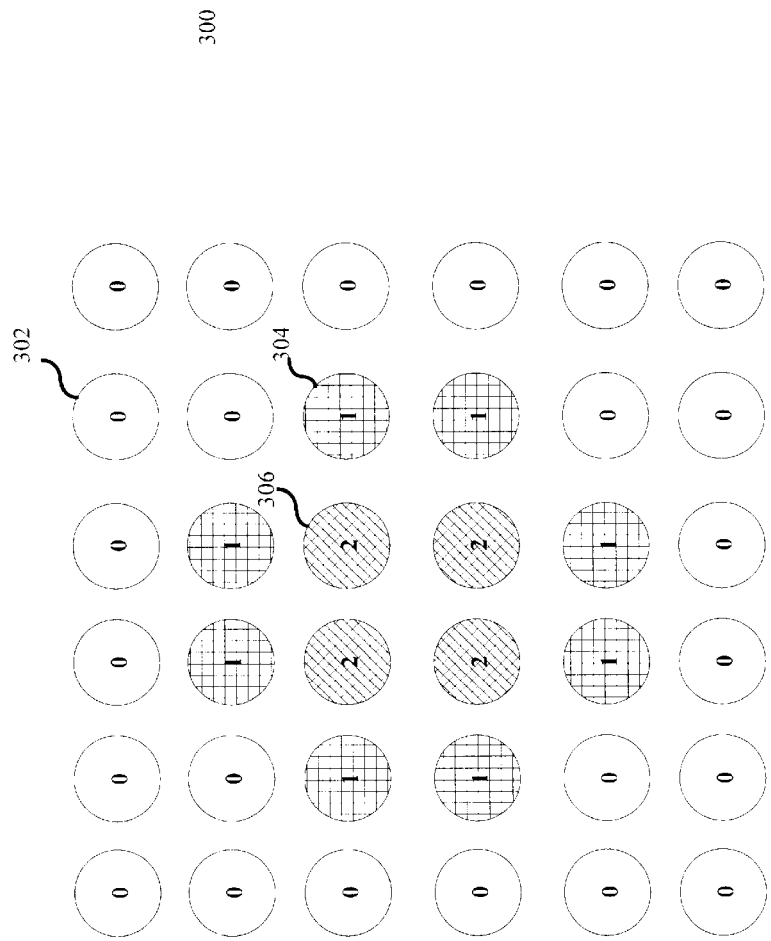
FIG. 9 is a kernel used in conjunction with the FIG. 8 example.

In this example, ln is the natural logarithm function, Kernel A is a three-level filtering element shown diagrammatically in FIG. 9 as an array of pixels 300 which are pixels 302 having value 0 or pixels 304 having value 1 and pixels 306 having value 2. Image Memory A 314, in FIG. 2, contains Image A. Image Memory B 308, in FIG. 2, contains Image B. The convolution operation for this example is very simple, consisting of 16 bit integer addition of the pixel values contained in 12 regions of memory of Image A surrounding the pixel being valued in the convolution process wherein pixels underlying those having value 2 are added twice, then scaling that resulting value by a normalizing factor, 16. The Kernel 300 was conceived conveniently so that scaling which follows the addition can be accomplished by a simple shift of 4 bits to the right (most significant 8 bits are retained) for the binary result. It may be sufficiently fast to simply perform the integer multiply accumulate operation for non-unity elements of the kernel. For Intel® Pentium II and Pentium III processors, the Latency/Throughput would require 1 CPU cycle per integer multiply and 1 CPU cycle per accumulate. Generally, a small portion of Image A, 314 in FIG. 2, is brought into cache memory for this process, providing very fast local memory access. During this operation, the Image A pixel value from which the convolved result is to be subtracted is already loaded into this memory. Continuing the example of FIG. 8, after the convolution operation, a subtraction from the original Image A pixel value is done by the CPU, providing the intermediate resulting numerator. The intermediate result does not have to be saved back to an output memory. Instead, the result is used for a division operation. The division by the associated pixel value in Image B is a major impediment to achieving the intended result, since it takes an inordinate amount of CPU time to accomplish. For Intel® Pentium II and Pentium III processors, the Latency/ Throughput [reference Intel Architecture Optimization Reference Manual page 1–8 Table 1-1] for integer ALU operations is latency 1, throughput 1 per cycle. In contrast, the floating-point divide instruction requires 18 cycles for single precision and 32 cycles for double-precision, extended precision 38 cycles. In the Intel Pentium® processor, the throughput of the divide operation is non-pipelined. In this example, we can circumvent the need to do this division by using the LUT 306 shown in FIG. 8 wherein the pixel values for Image A and Image B are input to the LUT to form a 16 bit address covering all possible values of output result. A single memory access (1 cycle) provides the output divide result 326 in ⅟₁₈ the time required to perform the equivalent operation using the floating-point unit. In this illustrative example, only one output is required, but if an intermediate result were required, for other processing, it can be provided as indicated in 325. An example intermediate result might be the result C (equation 1) before the natural logarithm. Such an intermediate result would require more memory. In this example, the result 326 for C already incorporates the natural logarithm scale needed to complete the computation.

Figure 3:
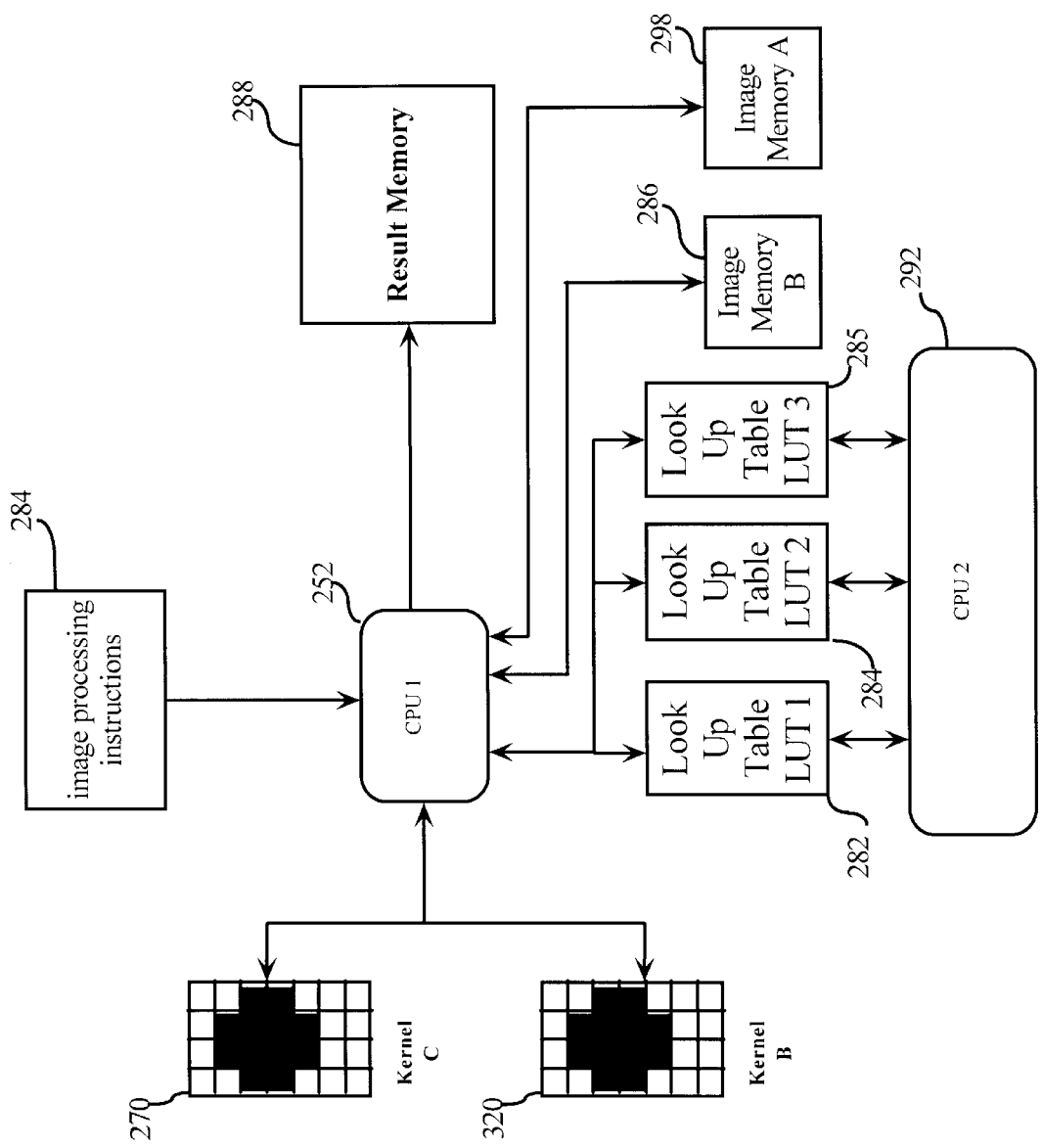
FIG. 3 is an illustrative block diagram showing the use of a CPU to create Look Up Tables for image processing.
Figure 10:
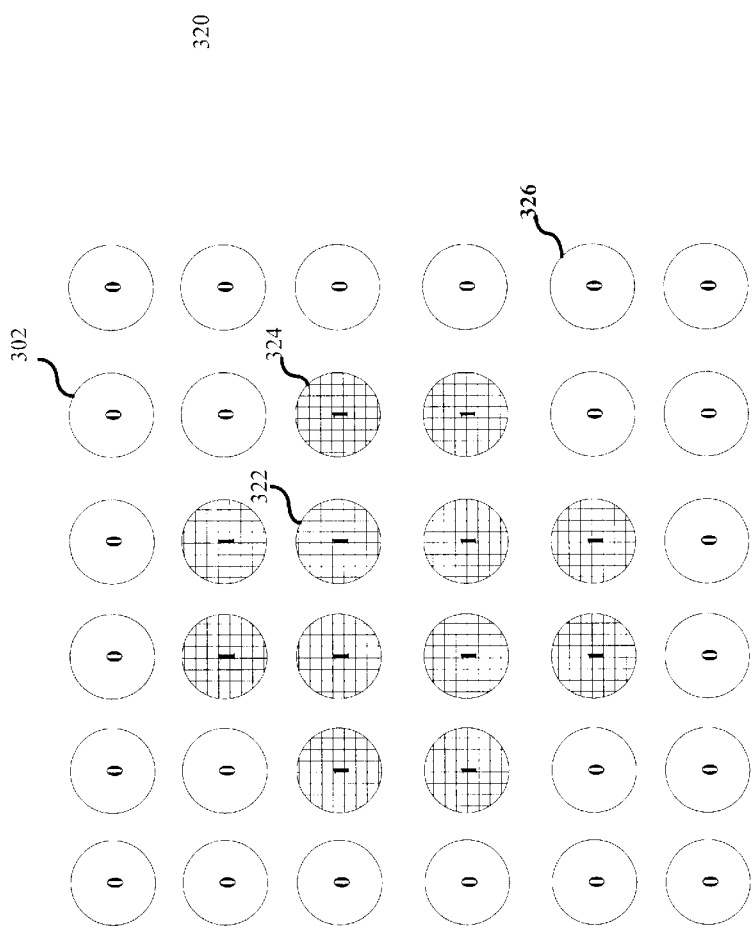
FIG. 10 is another kernel used in conjunction with the FIG. 11 example.
Figure 11:
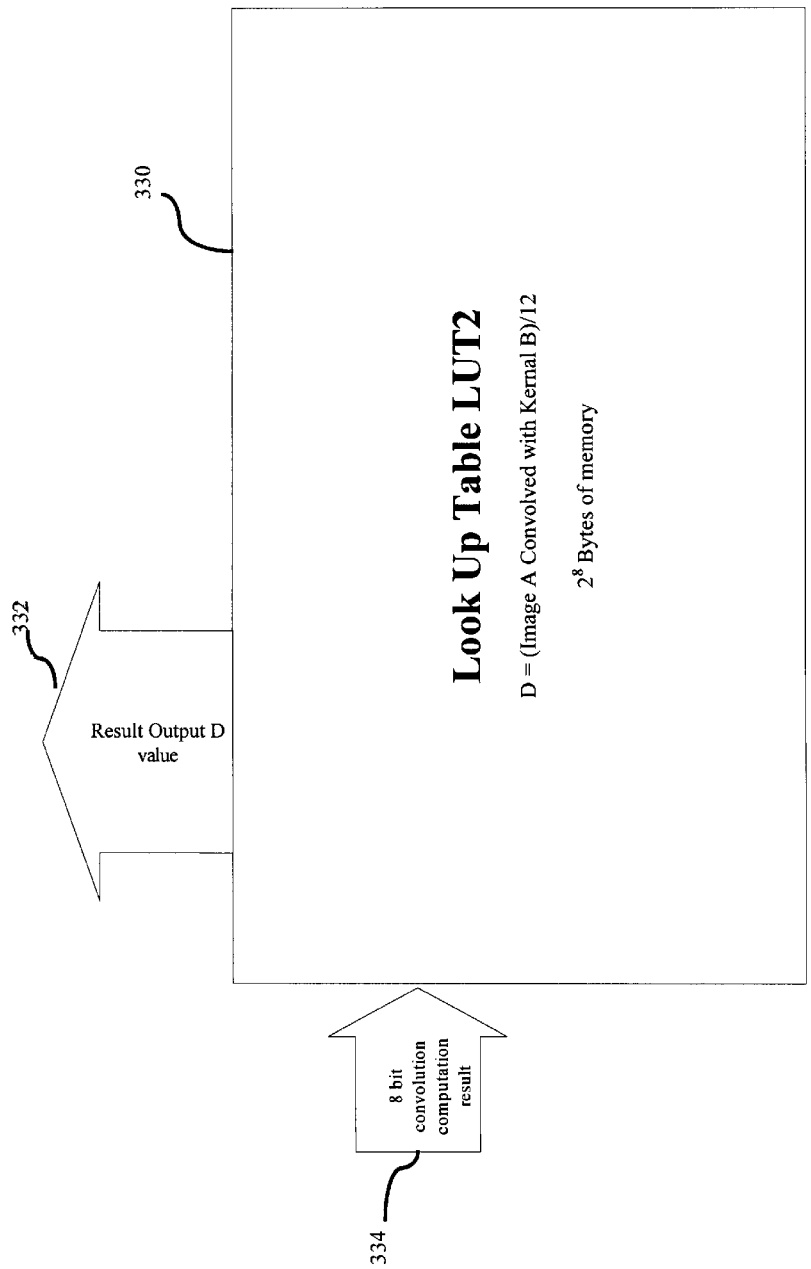
FIG. 11 is an example Look Up Table for division by 12

In a different preferred embodiment, Kernel B 320 may be required, as detailed in FIG. 10 wherein the Kernel B pixels are shown with integer unity value throughout. For this kernel the summation of the pixels completes the required multiply accumulate operation required by the convolution operation. In this embodiment the values of Kernel B are 8 bit integer values that require a scaling factor of 12 to normalize the convolution result. In order to avoid the divide operation for scaling the convolution result, it may be convenient to construct another LUT2 284 as shown in FIG. 3 for use in conjunction with 282 that in this example is the same as 314, FIG. 2. The scaled output result is made available as a single memory fetch operation requiring 1 cycle instead of the longer floating point divide operation as detailed earlier.

Figure 13:
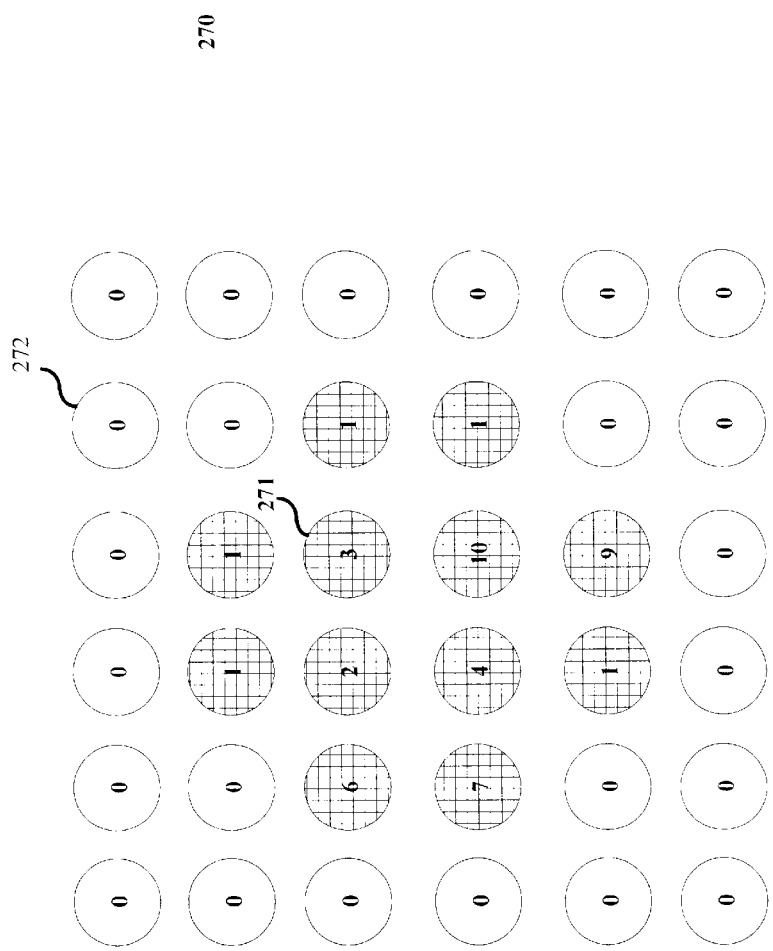
FIG. 13 is a kernel having only integer pixels

In a still more difficult embodiment, Kernel C 270 (FIG. 13) may be composed of pixels 271, 272 having 8 bit integer values that are not 1. In this event, either the integer multiply operation can be used as in the prior art to compute the convolution or another LUT3 285, FIG. 3, can be constructed to produce faster multiply result. As will be apparent to those skilled in the art, the illustrative values selected for this example are not intended to limit the application of this principle to broader applications, as for example where the resulting divide is not integer or the Kernel does not have integer values.

Figure 6:
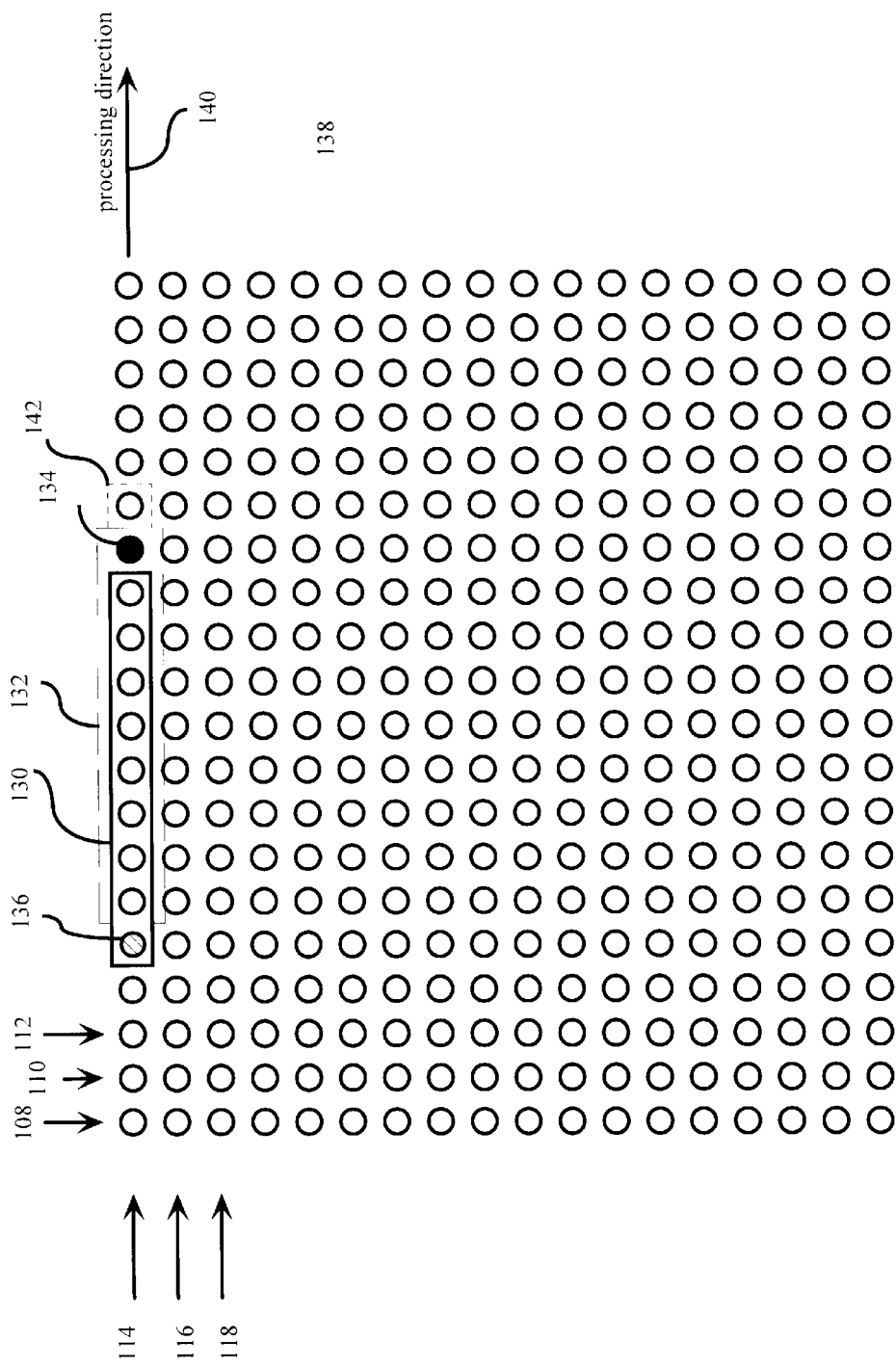
FIG. 6 is a pictorial diagram of pixels in image memory that are being processed by an elongated filter scanned horizontally through memory

Referring again to FIG. 1, the filtering operations defined for each CPU may require use of kernels 130 of the sort shown in FIG. 6 operating on a pixel array 138 which is arranged in rows such as 114, 116,118 and columns such as 108, 110, 112. In operation, the image is processed horizontally 140 as indicated in FIG. 6. Here horizontal indicates the direction in which memory is most quickly accessed in blocks. The kernel 130 is a elongated flat filter wherein the relative weights of each element are the same. Elongated flat filters are a type of filter which is described and claimed in co-pending U.S. patent application entitled, "High Speed Image Processing Using a Cascade of Elongated Filters Programmed in a Computer", incorporated herein as reference 2). As will be apparent to those skilled in the art, the length of the kernel is arbitrary for this example. By conventional convolution, the output pixel value is the scaled sum of the products of each filter element with its associated pixel. So the pixels affected by the filter are shown diagrammatically as 130. To compute the output value for position 132 knowing the result 130, it is only necessary to add the multiplied result for pixel 134 to 130 and subtract the multiplied result for pixel 136. Other elements of the filtering operation do not change because the weights of the pixels are multiplied with are defined to be the same. For the 9 element filter shown 130, conventional operation would require 9 multiplies and 8 accumulates. Using the stored values (which could be regarded as a simplest of LUTs 264, FIG. 1), the filtered result for 132 can be computed with 2 multiplies, and 2 accumulations. A considerable savings of time results compared to computing the result without the prior knowledge of the result 130. Note that if the kernel for the flat filter has element values of 1, no multiply operations are required. Summing the elements of the filter creates the result. Note that flat filters are useful for nonlinear filtering also. If the mathematical operations of the filter operator are replaced by a maximum or minimum operation, as would be the case for morphological operators for dilation or erosion, a similar computational efficiency can be realized by considering only the values that change by virtue of the operators being the same throughout the flat filter. In the case of a non-linear operator, there is a special case where the maximum (or minimum) value is the value being left behind. In this case the maximum needs to be recomputed for the entire kernel (co-pending U.S. patent application reference 2).

Figure 7:
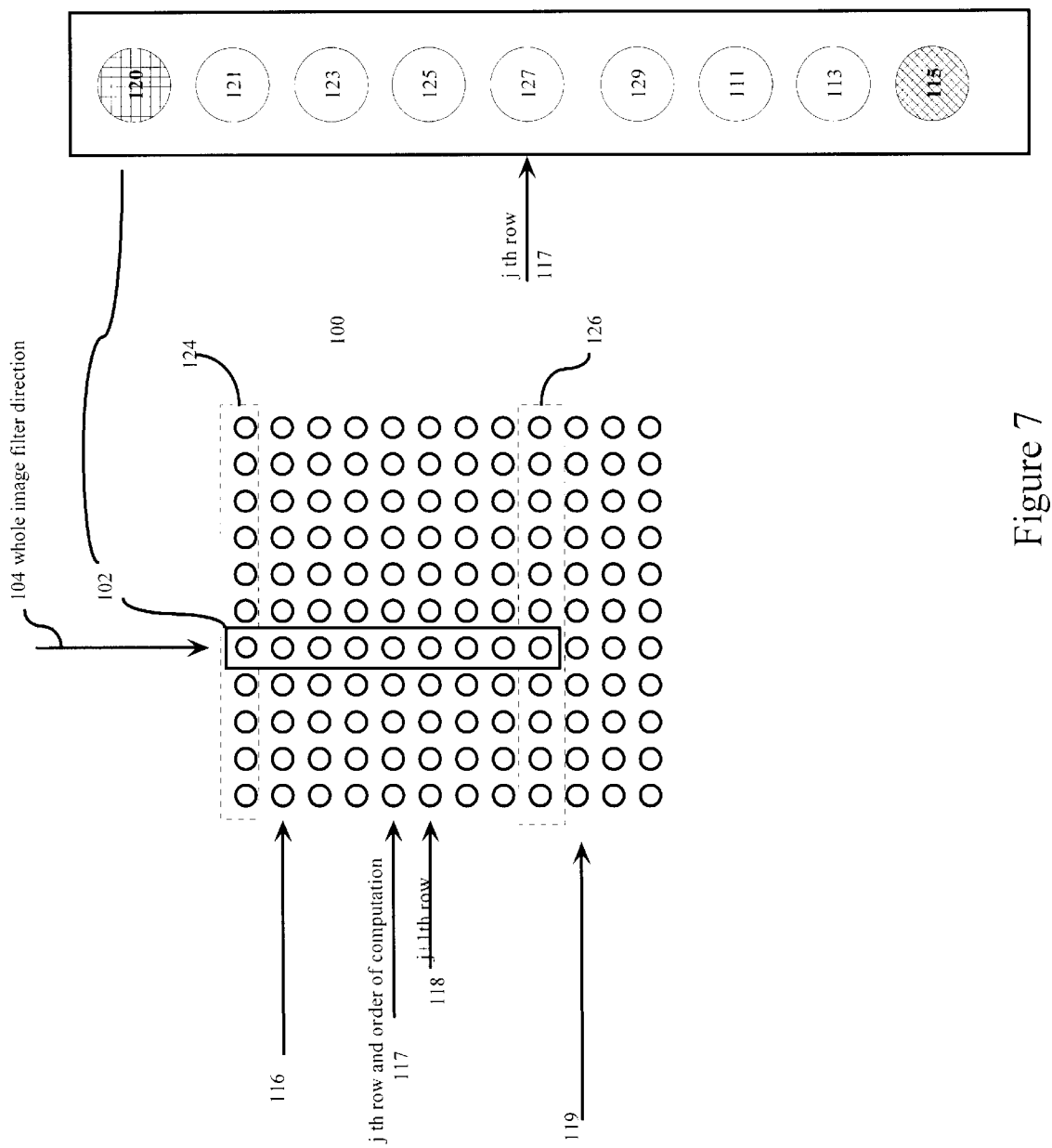
FIG. 7 is a pictorial diagram of pixels in image memory that are being processed vertically by a filter with efficient computation strategy.

Now referring to FIG. 7, an embodiment is shown wherein an elongated filtering element 102 operates to filter the image 100 in the direction 104. In this example the filter weights all have the same value. The filtered direction is aligned with the image columns. Because the filter is oriented vertically, the acquisition of pixel information may require multiple memory accesses to acquire all the image pixels that need to be available 120, 121, 123, 125, 127, 129, 111, 113, 115 to produce an output. Note that once the output result is known for the pixel in the j-1$^{th}$ row, the output result for the j$^{th}$ row 117 can be determined by subtracting the product of the filter weight and the image pixel 120 from the previous (j-1$^{th}$) output and adding the product of the filter weight and the new image pixel 115. All other product terms in the filter remain unchanged because it is a flat filter. This is the same idea as taught in FIG. 6, but because the filter operates vertically, more time can be saved by reading in row 124 and row 126 and computing the output result based on the new pixel values horizontally across the image until completing the entire j$^{th}$ row. The filter is then incremented one row and the process is repeated. Only new rows 116, 119 and the output result for the jth row 117 are necessary to compute the new output pixel value for the j+1th row 118, thus saving considerable memory access and computational time while accomplishing the task of filtering the image vertically. A flat filter with kernel values that are all of magnitude 1 further reduces the overall computations by eliminating the multiplication operation. Those skilled in the art will appreciate that the output result for the jth row 117 can be stored in cache memory for computing the new output pixel value for the j+1th row 118 to improve the processing efficiency.

Figure 4:
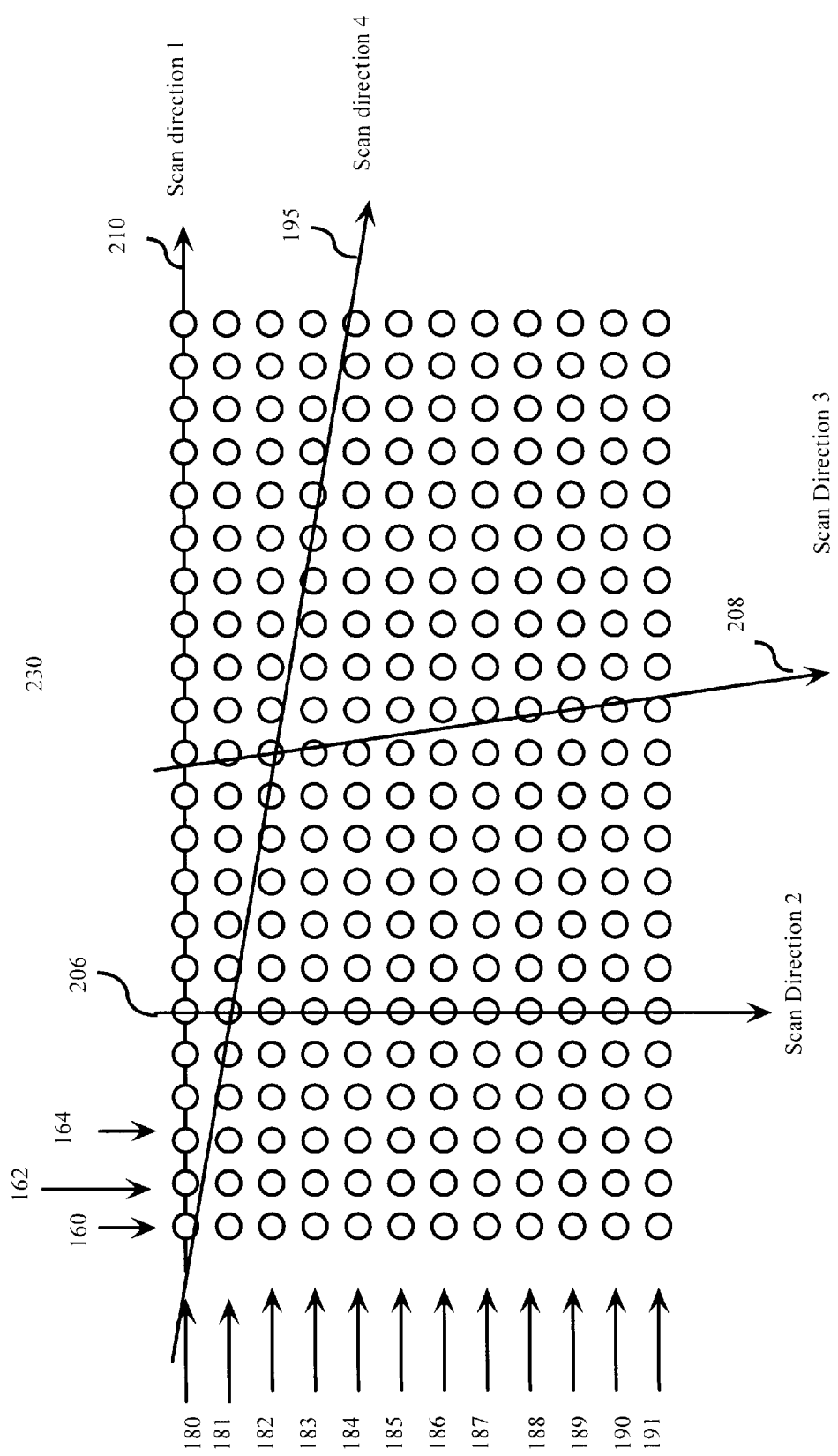
FIG. 4 is a pictorial diagram of pixels in image memory showing the horizontal, vertical and off axis scanning directions.
Figure 5:
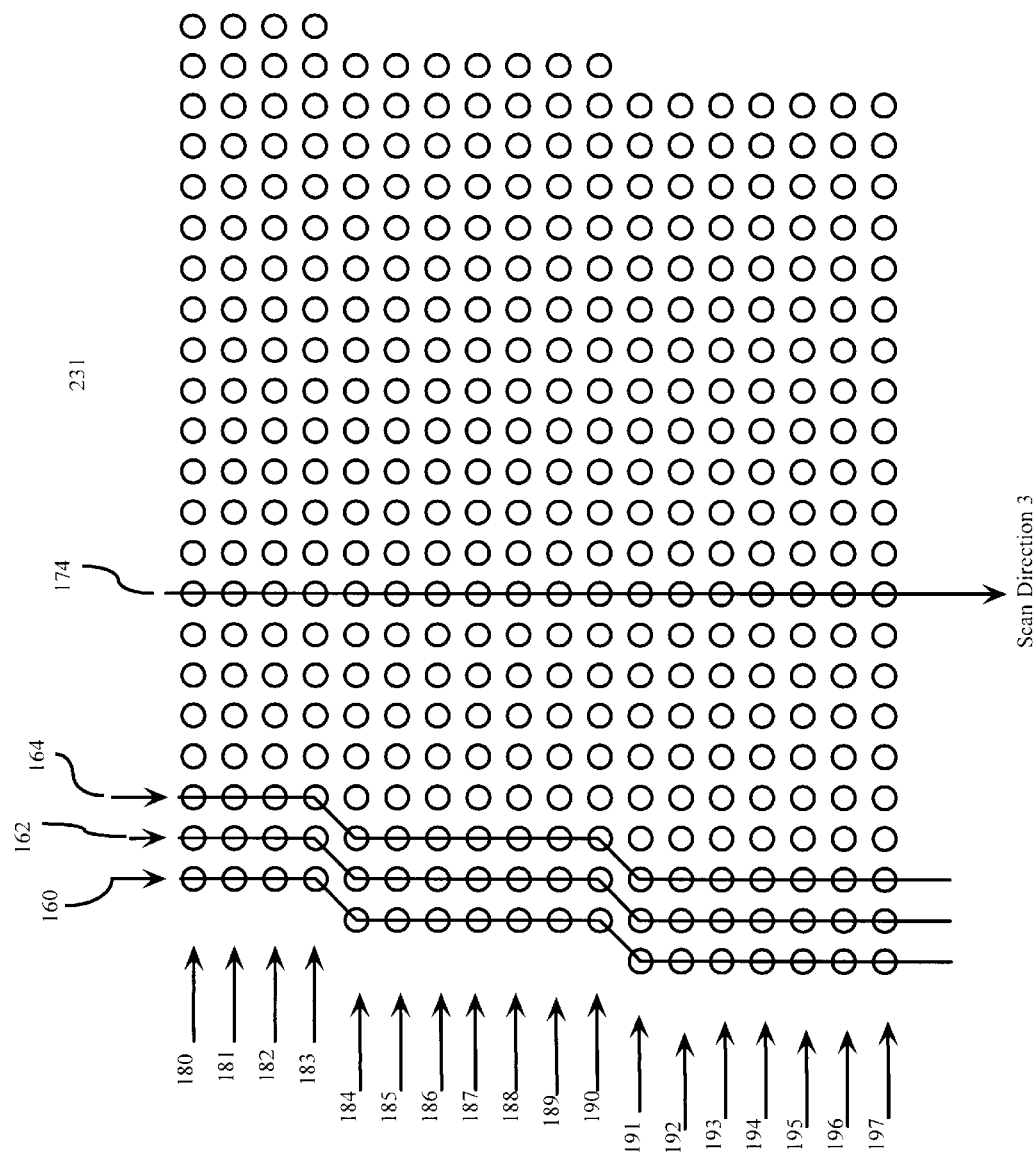
FIG. 5 is a pictorial diagram of pixels in image memory that have been offset by memory address increments so that the off-axis scan can be accomplished using vertical processing.
Figure 12:
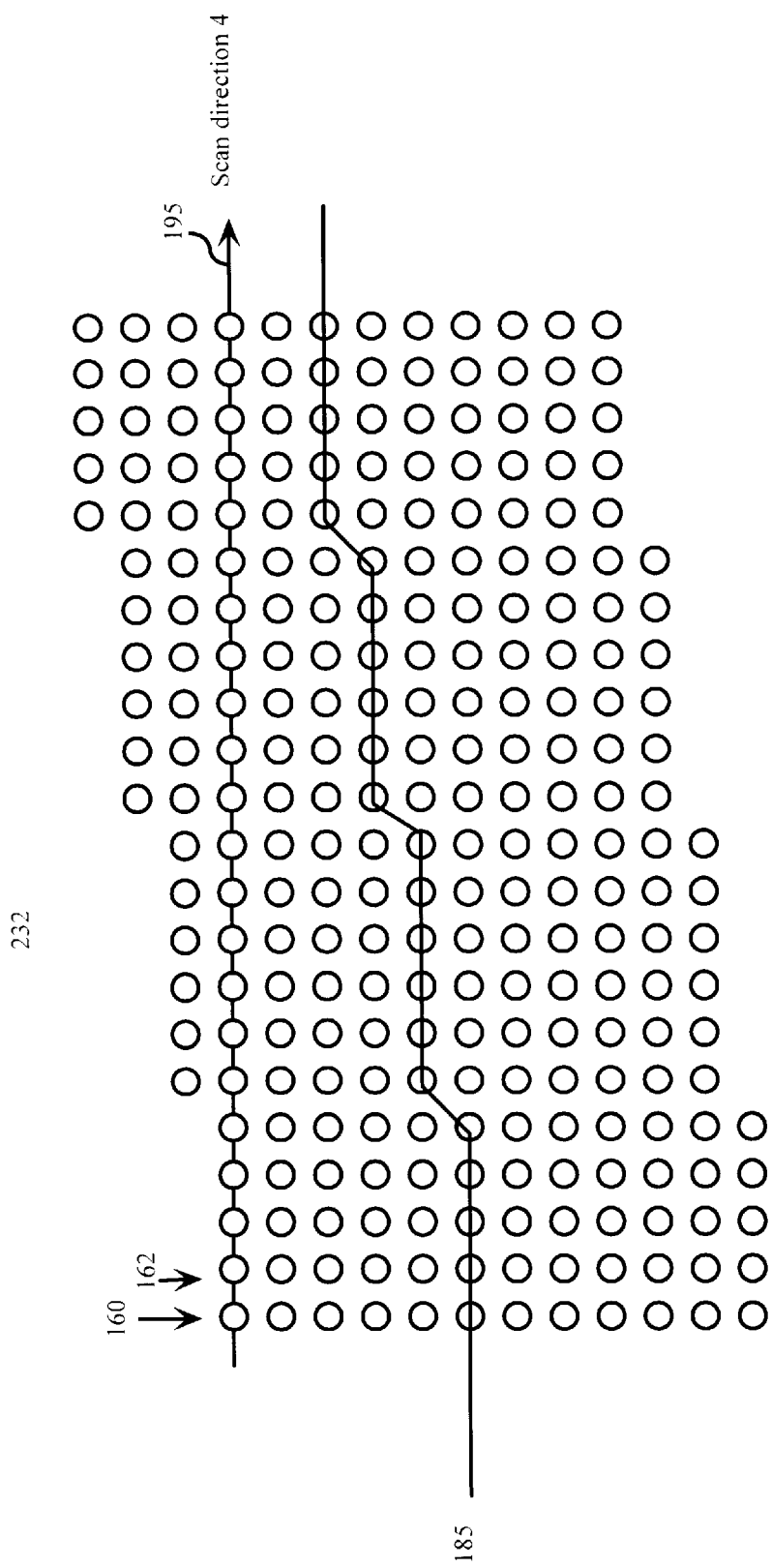
FIG. 12 is a pictorial diagram of pixels in image memory that have been offset by memory address increments so that the off-axis scan can be accomplished using horizontal processing.

The task of scanning a kernel for filtering in an image processing operation is sometimes not preferentially done in either the horizontal or vertical axis of the image. In the basic image processing system 290, FIG. 1, an address offset capability 274 is provided to enable a filtering operation in a direction unaligned from either axis of the pixel arrangement of an image as depicted in 230, FIG. 4. In an image processing embodiment, such an instance occurs when searching for radial asymmetries in an image. FIG. 4 illustrates the situation wherein the scan direction 3 208 is desired to be an elongated filtering axis. In this embodiment, scan direction 1 210 corresponds to the row organization of pixels in the input image and scan direction 2 206 corresponds to the column organization of pixels in the input image. The advantages for elongated flat filter processing for both vertical and horizontal filtering can be realized while processing in an off-axis direction if the addresses of either the rows or columns are offset to align the processing direction with the new row or column organization of the image 231 FIG. 5, 232 FIG. 12. FIG. 5 shows how the column address of rows 184–190 and rows 191–197 have been decremented so as to align the image pixels with the desired scan direction 3 208, FIG. 4,174 FIG. 5. In this illustration, the original columns 160, 162, 164 are traced and the new organization of image columns 174, FIG. 5, is indicated. In an embodiment, the address offset is accomplished by computing the offset required for each row that is most nearly associated with the scan direction. Using this method, the offset between the actual column position and the desired column position accumulates in an increasing manner until the criteria for decrementing the column counter is exceeded. Then the offset is applied and the process repeats. As will be apparent to one skilled in the art, the process is similar if the row address is to be offset. FIG. 12 shows how to decrement a row address to align pixels for scan direction 4, 195. In this example, the original row 185 is traced and the new organization of image rows 195 is also indicated.

The offset of row or column address is not restricted to rows or columns done separately. Images may be reorganized for simple circular scanning as well. In this example, both row and column addresses would be offset simultaneously for processing. In still another example, if multiple images reflecting object motion in time are processed, images may preferentially be organized according to a particular object location within the image with related images having offset addressing in more than one axis. This organization of image memory to effect off axis processing is useful for all types of directionally sensitive image processing operations, but is particularly useful if elongated flat filters are to be applied. The offset values can be pre-computed and stored in memory. As will be apparent to those skilled in the art and particularly to those familiar with the two copending patent applications, reference 1 and reference 2, this process saves even more processing time for multidimensional processing where image data may involve multi-spectrum, time movement, and/or three-dimensional (x, y, z) processing.

The following patent applications are incorporated by reference hereto:

1. Co-Pending U.S. Patent Application entitled, "Image Processing Apparatus Using a Cascade of Poly-Point Operations Programmed in A Computer", by Shih-Jong James Lee
2. Co-Pending U.S. Patent Application filed on the same date as this application entitled "High Speed Image Processing Apparatus using Cascade of Elongated Filters Programmed in A Computer" by Shih-Jong James Lee et. al.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

what is claimed is:

1. An image processing apparatus comprising:
    a) a central processing unit having a data bus and an address bus to access and load data;
    b) a memory to store images, wherein the memory is connected to the central processing unit through the data bus and the address bus,
    c) processing an image in accordance with a program for the central processing unit that performs at least one filter operation on image data loaded from the memory through the data bus and the address bus to produce an output result
    d) means for memory addressing selected from the set consisting of
        i. incrementing horizontally to accomplish filtering in the vertical axis,
        ii. incrementing in a circular fashion to facilitate filtering along a spiral axis of the image,
        iii. incrementing responsive to a common object location within a sequence of images to facilitate filtering of a sequence of images responsive to the common object location.

2. The apparatus of claim 1 wherein the filter axis is selected from the group consisting of vertical, horizontal, off-axis, and circular.

3. The apparatus of claim 1 wherein the filter is an elongated flat filter.

4. The apparatus of claim 1 wherein the filter is an elongated filter performing a morphological operation.

5. The apparatus of claim 3 wherein the elongated filter output value is computed by:
    a. computing an initial result for an initial filter position;
    b. incrementing the filter position by one pixel to a new position;
    c. subtracting the response of the excluded pixel from the initial result;
    d. adding the response attributed to the newly included pixel to the initial result to obtain a new output value for the new position.

6. The apparatus of claim 5 wherein the new filter position is incremented horizontally until the end of the image row is reached, then the filter position is incremented vertically.

7. An image processing apparatus comprising:
    a. at least one central processing unit having a data bus and an address bus to access and load data;
    b. image memory to store images, wherein the memory is connected to the central processing unit through the data bus and the address bus,
    c. LUT memory to store at least one look up table of pre-computed results wherein the LUT memory is connected to the central processing unit through the data bus and the address bus,
    d. a program directs the central processing unit to perform at least one elongated filter operation on image data using the LUT.

8. The apparatus of claim 7 wherein the LUT memory contains a plurality of output results responsive to a single LUT memory address.

* * * * *